(12) United States Patent
Slate et al.

(10) Patent No.: US 6,789,507 B1
(45) Date of Patent: Sep. 14, 2004

(54) OXYGEN FLOW CONTROL PROCESS FOR HATCHERY HATCHERS

(76) Inventors: Paul Davis Slate, 155 Ridgeway Rd., DeQueen, AR (US) 71832; Jerry Lynn Brazeal, 890 Johnson Bridge Rd., DeQueen, AR (US) 71832

( * ) Notice: Subject to any disclaimer, the term of this patent is extended or adjusted under 35 U.S.C. 154(b) by 0 days.

(21) Appl. No.: 10/401,909

(22) Filed: Mar. 28, 2003

Related U.S. Application Data

(60) Provisional application No. 60/408,084, filed on Sep. 3, 2002.

(51) Int. Cl.$^7$ ............................................... A01K 31/19
(52) U.S. Cl. ...................... 119/302; 119/322; 119/304; 119/448
(58) Field of Search .................... 119/300–338, 448; 237/3, 14

(56) References Cited

U.S. PATENT DOCUMENTS

| | | | | |
|---|---|---|---|---|
| 1,781,336 A | * | 11/1930 | Marshall | 119/311 |
| 2,646,930 A | * | 7/1953 | Dryden | 236/2 |
| 2,997,021 A | * | 8/1961 | Bailey | 119/311 |
| 3,817,214 A | * | 6/1974 | Bardet | 119/300 |
| 5,005,523 A | * | 4/1991 | Foster | 119/319 |
| 5,025,619 A | * | 6/1991 | Cannon | 119/300 |
| 5,226,385 A | * | 7/1993 | Cannon | 119/300 |
| 5,657,720 A | * | 8/1997 | Walters | 119/317 |
| 5,865,142 A | * | 2/1999 | Chang | 119/318 |
| 6,182,608 B1 | * | 2/2001 | Cannon | 119/300 |
| 6,481,380 B1 | * | 11/2002 | Barnett, Sr. | 119/437 |

FOREIGN PATENT DOCUMENTS

| | | | | |
|---|---|---|---|---|
| DE | 3506404 | * | 10/1985 | A01K/41/00 |
| GB | 2056247 A | * | 7/1980 | A01K/41/04 |

OTHER PUBLICATIONS

Chicken Operations Manual for Jamesway Incubation Systems, Aug. 1993, p. 82, Jamesway Incubator Company, Matthews, North Carolina.

Chick Master Pro Hatch Operating Instructions and Parts; Manual With Ultra Controls, Sep. 1999, Section 1.6 pp. 1–3, Chick Master Incubator Company, Medina, Ohio.

* cited by examiner

*Primary Examiner*—Peter M. Poon
*Assistant Examiner*—Andrea M. Valenti

(57) ABSTRACT

A method that increases the volume of fresh air into hatchers (10) during the last 24 hours before chicks are pulled from the hatcher (10). This method increases the volume of fresh air into the hatcher (10), while at the same time not upsetting the preset internal temperature and humidity settings inside the hatcher (10). This is done by gradually increasing the hatcher hallway room (24) temperature, humidity and air pressure at predetermined times to predetermined settings during the final 24 hours of the three day hatch cycle, which causes the damper door (22) on top of the hatcher (10) to open and stay open, thereby allowing a greater volume of fresh air to be forced into the hatcher (10). Due to the increased air pressure, excess carbon dioxide is exhausted out the back of the hatcher (10) through the exhaust vents (18) dropping the carbon dioxide level to the lowest level possible to benefit newly hatch chicks.

3 Claims, 4 Drawing Sheets

OXYGEN FLOW CONTROL PROCESS FOR HATCHERY HATCHERS

CROSS-REFERENCED TO RELATED APPLICATIONS

This application claim the benefit of PPA application Ser. No. 60/408,084 filed on Sep. 3, 2002 by Paul Davis Slate and Jerry Lynn Brazeal, entitled Oxygen Flow Control Process for Hatchery Hatchers.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates to a method for hatching bird eggs and, more particularly, to a method that increases the volume of fresh air to newly hatching chicks, while at the same time not upsetting the preset internal temperature and humidity settings in the hatcher.

2. Description of the Related Art

Egg hatcheries with hatcher equipment are well known in the art Commercial hatcheries place eggs in an incubator for a period of 18 days and then transfer eggs to a hatcher for the final three days. Chicks are hatched in a very confined area. A typical hatcher holds about 15,000 eggs in a space approximately 6' high by 8' wide by 6' deep. Hatcher hallway room temperature, humidity and air pressure settings are kept the same throughout the three day hatch cycle. Fresh air enters the hatcher through a sliding damper door on top of the hatcher. This damper door is controlled by temperature sensors in the hatcher. If the temperature in the hatcher rises above the desired setting the damper door opens allowing fresh air to enter the hatcher from the hatcher hallway room. If temperature in the hatcher drops below the desired setting the damper door closes to within about ⅛ of an inch thereby restricting the fresh air flow to chicks. One concern for operating a hatcher is to maintain the ambient air around the hatcher at an optimum temperature of between 70 and 80 degrees F. while maintaining the temperature within the hatcher at from 98.5 to 99 degrees F.

Current hatcher equipment that is used in hatchers does not allow for enough air volume to enter through the damper door in the hatcher to sustain life of all hatched birds during the list 24 hours of the 3 day hatch cycle before birds are pulled from the hatcher. If you follow the instructions for some current hatcher equipment, you maintain a relative humidity of from 45% to 60% with an optimum hallway temperature setting of 80 degrees F. and air pressure of 0.005 in. w.g. to 0.015 in. w.g. for systems with heating and mechanical cooling and 0.025 in. w.g. to 0.035 in. w.g. for systems with evaporative cooling. These setting are maintained throughout the entire three day hatch cycle. However, those settings do not allow the damper door to open far enough, nor is these sufficient air pressure to pump a sufficient volume of fresh air into the hatcher to benefit newly hatching chicks during the final 24 hour period of the 3 day hatch cycle before birds are pulled from the hatcher. These equipment manuals do not discuss the need for an increased volume of f air to be forced into the hatcher during the final 24 hours of the 3 day hatch cycle, nor a way to increase the volume of fresh air that flows into the hatcher.

Other concerns include maintain the proper humidity and mixture of goes within the hatcher equipment. A further concern for operating these hatcheries is to maintain a proper balance with the right temperature, and humidity in the hatcher to gain the optimum number of live hatched Chicks.

It must be remembered that in commercial hatcheries incubator and hatcher equipment are two separate pieces of equipment. Some patents for hatchery equipment address ways to maintain the desire temperature and humidity in an incubator and in a hatcher, but do not discuss or suggest a way to increase the volume of fresh air into a hatcher as chicks begin to hatch out, while at the same time not upsetting the preset internal temperature and humidity setting in the hatcher. For example: U.S. Pat. No. 5,025,619 to Cannon, Jun. 25, 1991, discussed an apparatus that maintain proper temperature by circulating hot or cold water through coils to either raise or lower the temperature to the desired setting. This apparatus is used in some incubators and some hatches. Cannon does not suggest a need to increase the volume of fresh air into the hatcher during the final 24 hours of the 3 day hatch cycle, nor a method to do so. U.S. Pat. No. 6,182,608 to Cannon, Feb. 6, 2001, discussed an apparatus that maintaing proper temperature by passing air though an enclosed serpentine path to draw heat from inside an insulated enclosure into the enclosed serpentine path. Again Cannon does not suggest a need to increase the volume of fresh air into the hatcher during the final 24 hours of the 3 day hatch cycle, nor a method to do so. U.S. Pat. No. 5,657,720 to Walters, Aug. 19, 1997, discussed an egg turning device and having a flow, temperate, and humidity preset and then electronically monitored. However Waltes does not suggest a need to increase the volume of fresh air into the hatcher during the final 24 hours of the 3 day hatch cycle, nor a method to do so. A common drawback of these three patents is that they do not suggest a need for an increased volume of fresh air during the fill 24 hours of the 3 day hatch cycle, nor a way to force an increased volume of fresh air into a hatcher as chicks begin to hatch out, while at the same time not upsetting the preset internal temperature and humidity settings in the hatcher.

Some of the problems hatcheries have experienced in the past are: temperature too low causing a slow hatch and a high number of chicks not fully hatched, thereby resulting in a lower live hatch percentage. Another problem hatcheries have experienced is not bank adequate ventilation. If the temperature in the hatcher halfway room is too low, the cooler air from the hallway enters the hatcher through the damper door causing the temperature to drop in the hatcher. Then temperature sensors in the hatcher causes the damper door to close to within approximately ⅛ of an inch. This small of an opening does not allow for a sufficient volume of fresh air to enter the hatcher during the critical period 24 hours before the chicks are pulled from hatcher. Then lack of sufficient fresh air causes many of the chicks to either suffocate or experience the ill effects that comes from breathing high levels of carbon dioxides which causes many to die, thereby resume in a lower live hatch percentage and a higher seven day mortality percentage. The seven day morality percentage refers to any chicks that die within seven days of leaving the hatcher. This problem is often misdiagnosed as over heating.

Fertility percentages of egg is from 90 to 95 percent, however live hatch percentages range only from about 78 to 86 percent, indicating there is still room for improvement. There are a number of hatchers available commercially. While these prior art devices work for their intended purpose, they do not achieve the kinds of hatch rates that can be achieved by following the method that is described hereinafter. The reason their hatch rates are lower is that they do not address the need to increase the volume of fresh air into the hatcher during the final 24 hours of the 3 day hatch cycle as chicks begin to hatch out. Therefore, the need remains for an improved method to increase the volume of fresh air that flows to newly hatching chicks in the hatcher, especially during the final 24 hours before pull time, so as to increase number of live hatched chicks, while at the same time, not upsetting the preset internal temperature and humidity settings in the hatcher to properly hatch out the optimum number of eggs.

BRIEF SUMMARY OF THE INVENTION

The object of this method is to increase the number of live birds hatched in a hatcher by providing an imposed volume of fresh air to chicks during the final 24 hours of the 3 day hatch cycle.

Another object of this method is to not upset the preset internal temperature and humidity setting in the hatcher while at the same time increasing the volume of fresh air to newly hatching chicks.

Another object of this method is to reduce a condition called red hock, reduce suffocation of chicks and to produce a healthier bird by limiting the ill effects breathing high levels of carbon dioxide has on newly hatched chicks by increasing the volume of fresh air flowing to them.

Yet another object of this method is to decrease the seven day mortality mate of chicks because they leave the hatchery stronger as a result of providing an increased volume of fresh air at time of hatching.

Still another object of this method is to make the live hatch percentages more consistent year round.

Still another object of this method is to improve the hatching ability of existing hatcher equipment without expensive modifications being made to the hatcher equipment.

This invention is a new method that increases the volume of fresh air in hatchers while at the same time not upsetting the preset internal temperature and humidity settings in the hatcher to produce a higher live hatch percentage.

Our method is designed to increase the volume of fresh air through the damper door in the hatcher especially during the final 24 hours before pull time. To get an increased volume of fresh air into the hatcher, the damper door must remain open. Therefore, our method is described as follows when eggs are transferred into the hatcher for the first two days hatcher hallway room settings remain at the factory setting then 24 hours before pull time, hatcher hallway room relative humidity should be at least 65% and air pressure at 0.01 PSI with temperature set at 82 degrees. We call this out start setting. Then about 16 hours before pull time, hatcher hallway room air pressure is increased to between 0.02 PSI and 0.06 PSI for heating and mechanical cooling systems and be 0.036 and 0.06 for evaporative cooling systems. In order for the hatching chicks to benefit from the increased volume of fresh air the damper door has to open wider. To cause the hatcher damper door to open wider you have to increase the temperature and/or humidity in the hatcher hallway room. Temperature can be increased to between 82 and 90 degrees nor increased the humidity to between 65% and 90% depending on the hatchery. Then about 10 hours before pull time raise the hatcher hallway room air pressure to been 0.06 PSI and 0.10 PSI and you must also increase the hatcher hallway room temperature accordingly in order to keep the damper door open because of the increased air pressure. The object is to keep the damper door wide open. You must remember that chicks are hatched in a very confined area, so as the chicks hatch out there is an ever increasing need for a greater volume of fresh air to be forced into the hatcher and a need to reduce the carbon dioxide level to the lowest level possible. This method will result in a healthier, stronger chick and a higher live hatch percentage.

This method tested at the following hatcheries: OK Foods hatchery, Ft. Smith, AR test resulted in a 3% gain in live hatch; ConAgra hatchery, Eldorado, AR test resulted in a 3% gain in live hatch. When extra maintain was done in the hatchery, an even higher percentage gain was achieved with this method.

DRAWINGS—REFERENCE NUMERALS

10 Hatcher Unit
12 Cart containing egg trays for holding eggs
14 Blow assembly with damper door bed
16 Exhaust Fans
18 Exhaust Vents
22 Damper door in open position with blower assembly removed
24 Hatcher hallway room

DETAILED DESCRIPTION OF THE INVENTION

Figure 1:
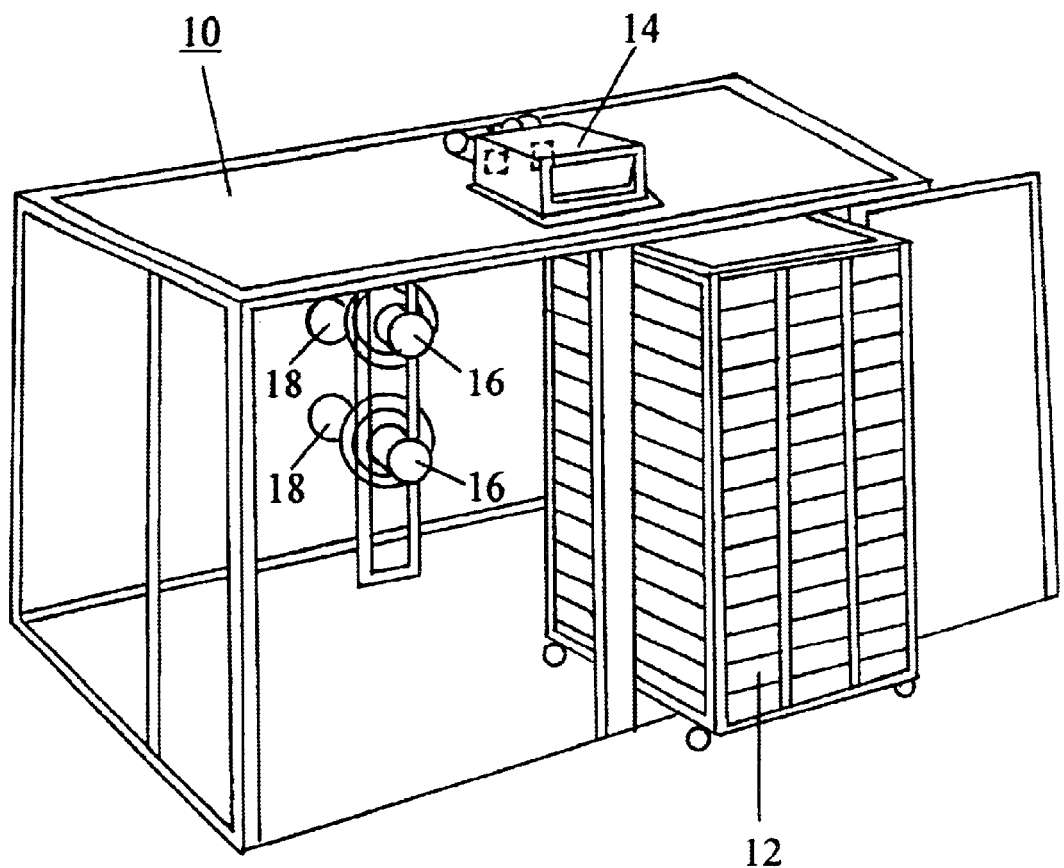
FIG. 1 is a view of a hatcher unit allowing you to se the blower assembly which has a sliding damper door beneath (damper door not visible) on top of the hatcher, exhaust vents and fans located in rear of the hatcher, and a cart containing egg trays for holding egg that slides into the hatcher.
Figure 2:
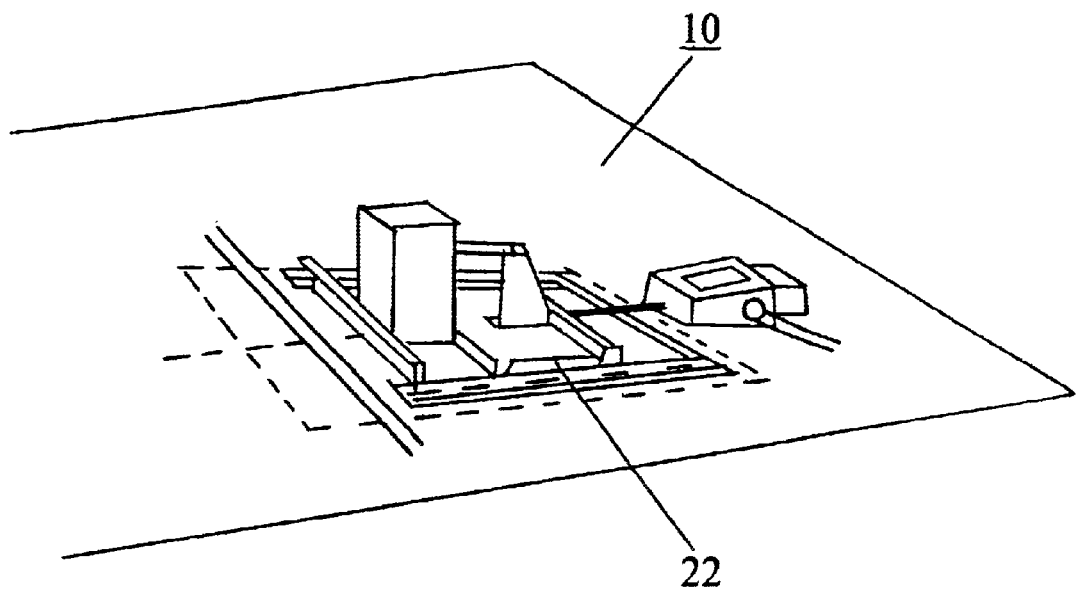
FIG. 2 is a view of the blower assembly on top of the hatcher showing the blower case removed allowing you to view the damper door, which was beneath it, in the open position.

This invention is a new method that increases the volume of fresh air into the hatcher 10 while at the same time not upsetting the preset internal temperature and humidity settings in the hatcher 10 to produce a higher live hatch percentage. Hatchers 10 use a damper door 22 (FIG. 2) and blow assembly 14 (FIG. 1) on top of the hatcher 10 (FIG. 2) to help control temperature in the hatcher 10, and provide ventilation and fresh air to newly hatched chicks. Hatcher 10 are designed to maintain a desired temperature setting inside the hatcher 10 of from 98.5 to 99 degrees F. There are exhaust fans 16 (FIG. 1) at the back of the hatcher 10 that run continuously to pull and circulate air through the hatcher 10 for ventilation purposes and to help exhaust excess on dioxide out the exhaust vents 18 (FIG. 1) in the back of the hatcher 10.

The operation of the damper door 22 (FIG. 2) on top of the hatcher 10 is controlled by a temperature control sensor (not shown) in the hatcher 10. If the sensor detects an increase in temperature the damper door 22 (FIG. 2) opens wider for greater ventilation thereby bringing the temperature down to the desired setting. If the temperature exceeds the maximum allowed temperature the blower assembly 14 (FIG. 1) is activated to cool the hatcher 10 down to the desired setting. If the temperature is too cool or low, heater coils (not shown) in the hatcher 10 will activate and bring the temperature back up to the desired setting.

Figure 3:
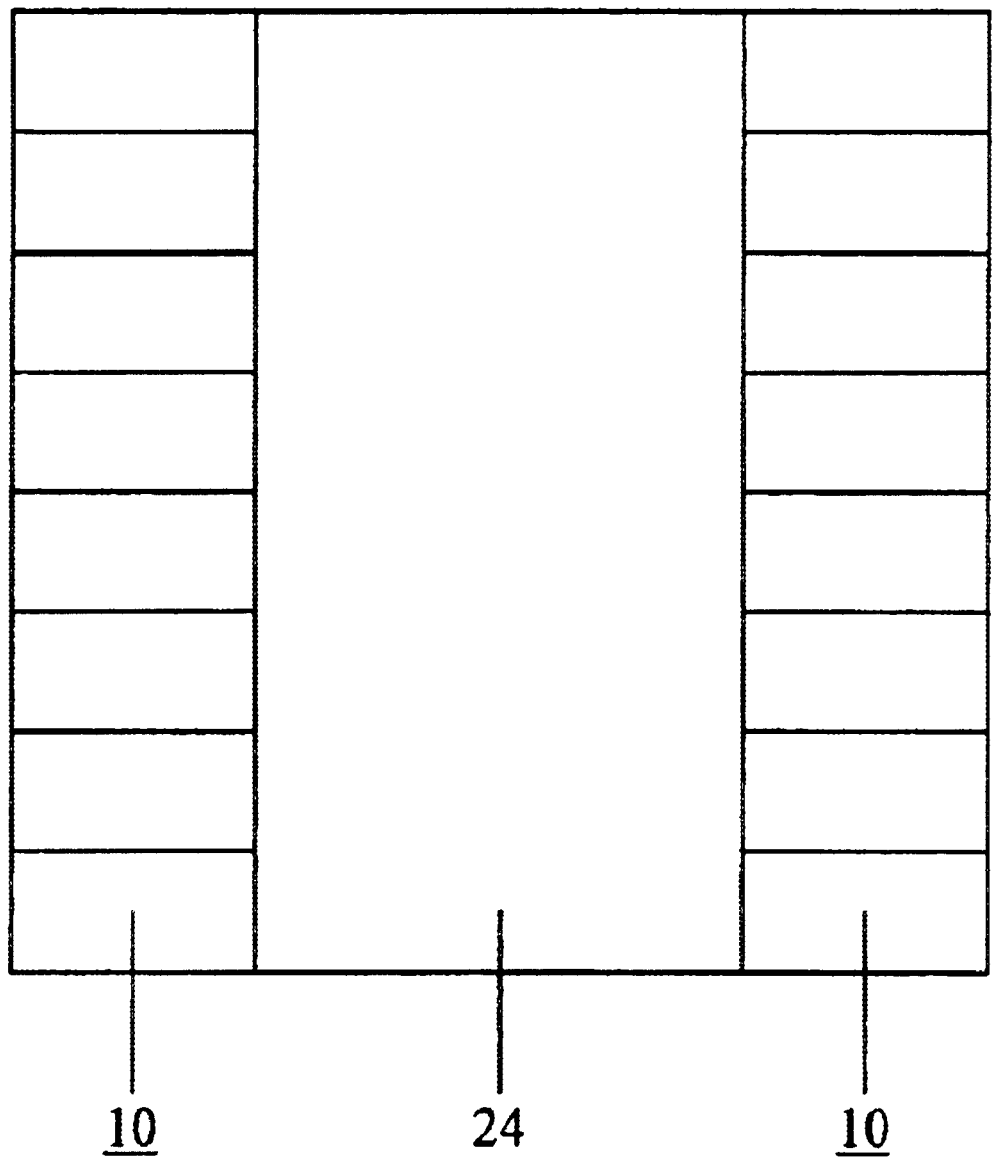
FIG. 3 is a view of a hatcher hallway room door plan showing the hallway down the and a row of hatchet positioned on either side.
Figure 4:
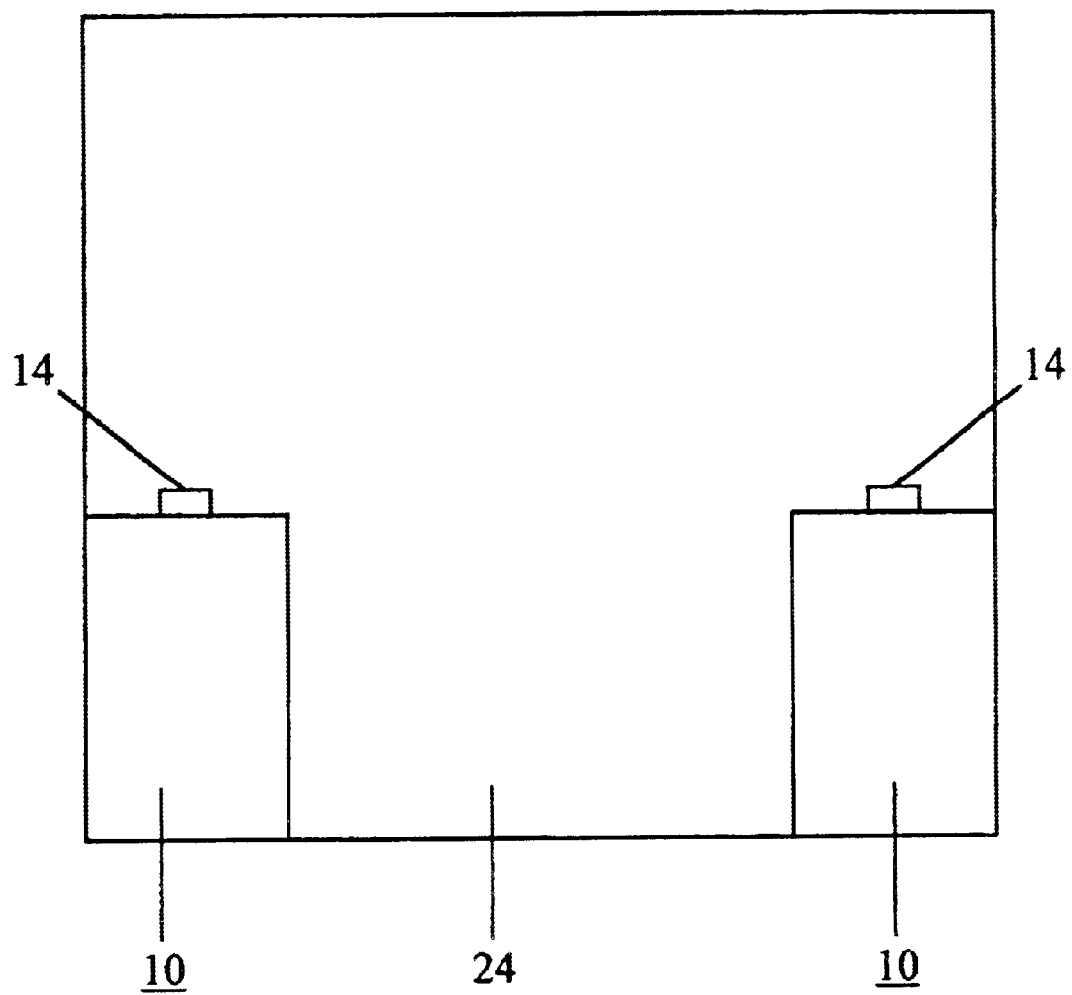
FIG. 4 is an end view of the hatcher hallway room showing the hallway down the middle with hatchers positioned on either side with blower assembly on top of the hatchers.

Some hatcher equipment manuals recommend the following in the hatcher hallway room 24 (FIGS. 3 and 4): relative humidity of from 45% to 60%, an optimum hallway 24 temperature of from 70 to 80 degrees F. and air pressure of from 0.005 in. w.g. to 0.015 in. w.g. for hatcheries with heating and mechanical cooling and air of from 0.025 in. w.g. to 0.035 in. w.g. for hatcheries with evaporative cooling. Hatcher equipment manuals recommend maintaining the same hatcher hallway room 24 (FIGS. 3 and 4) humidity, temperature and air pressure for the whole 3 day hatch cycle that eggs are in the hatcher 10. While these settings are fine at the beginning when you just have eggs in the hatcher 10, they are not the best settings when chicks begin to hatch out. The hatcher hallway room 24 (FIGS. 3 and 4) humidity, temperature and air pressure setting all too low as chicks begin to hatch out.

As chicks begin to hatch out there is an ever increasing need for greater amounts of fresh air for the new chicks. Hatchers 10 that are used in hatcheries do not allow for enough air volume in the hatcher 10 to sustain life of all hatched birds during the final 24 hours of the 3 day hatch cycle before birds are pulled from the hatchers 10. To be able to increase the fresh air supply to newly hatching chicks you must cause the damper door 22 (FIG. 2) to stay open on the hatcher 10. The hallway 24 (FIGS. 3,4) temperature, humidity and air pressure setting will have a direct impact on whether the damper door 22 (FIG. 2) is open or closed.

Our invention is a method that is desire to increase the volume of fresh air into the hatcher 10, especially during the final 24 hours of the 3 day hatch cycle before chicks are pulled from the hatcher 10, by causing the damper door 22 (FIG. 2) to open and then keeping it open. We recommend that the hatcher hallway room 24 (FIGS. 3 and 4) humidity, temperature and air pressure settings be adjusted differently from those encouraged in hatcher equipment manuals. Our method includes the following steps: when eggs are transferred into the hatcher 10 for the first two days hatcher hallway room 24 (FIGS. 3 and 4) settings remain at factory settings, then 24 hours before pull time relative humidity should be at least 65% and air pressure at 0.01 PSI with temperature set at 82 degrees. We call this our start setting. Then about 16 hours before pull time, hatcher hallway room 24 (FIGS. 3 and 4) air pressure is increased to between 0.02 PSI and 0.06 PSI for heating and mechanical cooling systems and between 0.036 and 0.06 for evaporative cooling systems. To cause the hatcher damper door 22 (FIG. 2) to open wider you have to increase the temperature in the hatcher hallway room 24 (FIGS. 3 and 4) to from 82 to 90 degrees and/or increase the humidity to between 65% and 90% depending on the hatchery. Then about 10 hours before pull time increase the hatcher hallway room 24 (FIGS. 3 and 4) air pressure to between 0.06 PSI and 0.10 PSI The object is to keep the damper door 22 (FIG. 2) wide open. You must increase the hatcher hallway room 24 (FIGS. 3 and 4) temperature and humidity in order to keep the damper door 22 (FIG. 2) open because you have increased the hatcher hallway room 24 (FIGS. 3 and 4) air pressure which will pump cooler air into the hatcher 10 and begin to cool the hatcher 10 down thereby causing the damper door 22 (FIG. 2) to begin to close. Therefore, you must compensate air pressure with heat and humidity to maintain the desired temperature setting inside the hatcher 10 and keep the damper door 22 (FIG. 2) open. You must remember that chicks are hatched in a very confined area. Eggs are loaded onto trays and put in a cart 12 (FIG. 1) that is loaded into the hatcher 10. Some has 10 house about 15,000 eggs in a space of approximately 6' high by 8' wide by 6' deep. As chicks hatch out them is an ever increasing need for a greater volume of fresh air to be forced into the hatcher 10 and the reel to reduce the carbon dioxide level to the lowest possible level by exhausting excess carbon dioxide out the exhaust vents 18 (FIG. 1) in the back of the hatcher 10. This is accomplished by increasing hatcher hallway room 24 (FIGS. 3 and 4) temperature, humidity, and air pressure which pumps greater amounts of fresh air into the hatcher 10 while not using the preset internal temperature and humidity settings inside the hatcher 10.

This method results in a healthier, stronger chick which increase the live hatch percentage and decreases seven day morality percentages. It reduces the number of chicks not fully hatched and the number of chicks that are weak or who have died as a result of suffocation or because of high levels of carbon dioxide due to not having enough fresh air pumped into them. It reduces a condition called red hock. This method win as cause a more consistent year round live hatch percentage.

We claim all modifications and variations coming within the spirit and scope of the following claim/claims.

We claim:

1. A method that increases the amount of fresh air into hatcher equipment through the hatcher damper door and reduces the carbon dioxide level in said hatcher to the lowest level possible, while at the same time not upsetting said hatcher's preset internal temperature and humidity settings, the method comprising:

at a predetermined time during the final 24 hours of the 3 day hatch cycle before chicks are pulled from said hatcher, adjustments are made increasing the hatcher hallway room temperature, humidity, and air pressure to a predetermined start setting which will keep said hatcher damper door open so that an increased volume, up to 10 times the normal volume, of fresh air can be forced into said hatcher by means of increased air pressure in said hatcher hallwayroom while at the same time not upsetting said hatcher's preset internal temperature and humidity settings.

2. The method of claim 1 including the further step of:

at a second predetermined time during the final 24 hours of the 3 day hatch cycle before chicks are pulled from said hatcher, adjustments are made further increasing said hatcher hallway room temperature, humidity, and air pressure to a second predetermined setting, which will continue to keep said hatcher damper door open while increasing the volume of fresh air being forced into said hatcher by means of increased air in said hatcher hallway room and at the same time not upsetting said hatcher's preset internal temperature and humidity settings.

3. The method of claim 2 including the further step of;

at a third predetermined time during the final 24 hours before chicks pulled from said hatcher, further adjustments are made increasing again said hatcher hallway room air pressure to a third predetermined setting, periodically checking said hatcher damper door and adjusting said hatcher hallway room temperature, humidity and air pressure whenever needed to assure said hatcher damper door stays open so that an increased volume of fresh air can be forced into said hatcher by means of increased air pressure in said hatcher hallway room, the fresh air that is forced into said hatcher also pushes excess carbon dioxide out exhaust vents in the back of said hatcher, thereby reducing said carbon dioxide level to the lowest level possible;

whereby an improved and greatly enlarged volume of fresh air is supplied to said chicks during the final 24 hours of the hatch cycle and carbon dioxide inside the hatcher has been reduced to the lowest level possible, which reduces suffocation and which results in an increased, more consistent year round live hatch percentage and a decreased seven day mortality percentage.

\* \* \* \* \*

UNITED STATES PATENT AND TRADEMARK OFFICE
CERTIFICATE OF CORRECTION

PATENT NO. : 6,789,507 B1
DATED : September 14, 2004
INVENTOR(S) : Paul Davis Slate and Jerry Lynn Brazeal It is certified that error appears in the above-identified patent and that said Letters Patent is hereby corrected as shown below:

Title page,
Item [57], ABSTRACT,
Line 16, "hatch chicks." change to -- hatching chicks. --

Column 1,
Line 31, change "the art" to -- the art. --
Line 50, change "in hatchers" to -- in hatcheries --
Line 53, change "the list 24" to -- the last 24 --
Line 63, change "is these sufficient" to -- is there sufficient --

Column 2,
Line 1, change "of f air" to -- of fresh air --
Line 4, change "includes maintain" to -- includes maintaining --
Line 5, change "of goes" to -- of gases --
Line 13, change "the desire" to -- the desired --
Line 19, change "that maintain" to -- that maintains --
Line 27, change "that maintaining" to -- that maintains --
Line 34, change "having a flow" to -- having air flow --
Line 35, change "Waltes" to -- Walters --
Line 40, change "the fill 24" to -- the final 24 --
Line 49, change "not bank" to -- not having --
Line 50, change "hatcher halfway" to -- hatcher hallway --
Line 57, change "Then lack" to -- The lack --
Line 61, change "thereby resume" to -- thereby resulting --

Column 3,
Line 20, change "an imposed" to -- an increased --
Line 33, change "mortality mate" to -- mortality rate --
Line 56, change "this out" to -- this our --
Line 66, change "nor increased" to -- and/or increase --

Column 4,
Line 22, change "to se" to -- to see --
Line 32, change "room door plan" to -- room floor plan --
Line 33, change "the and a row of hatchet" to -- the center and a row of hatchers --
Line 44, change "door bed" to -- door beneath --
Line 58, change "blow assembly" to -- blower assembly --
Line 60, change "Hatcher 10" to -- Hatchers 10 --
Line 65, change "excess on" to -- excess carbon --

UNITED STATES PATENT AND TRADEMARK OFFICE
CERTIFICATE OF CORRECTION

PATENT NO. : 6,789,507 B1
DATED : September 14, 2004
INVENTOR(S) : Paul Davis Slate and Jerry Lynn Brazeal It is certified that error appears in the above-identified patent and that said Letters Patent is hereby corrected as shown below:

Column 5,
Line 17, change "air of" to -- air pressure of --
Line 39, change "that is desire" to -- that is designed --

Column 6,
Line 10, change "Some has 10" to -- Some hatchers 10 --
Line 12, change "out them" to -- out there --
Line 14, change "reel to" to -- need to --
Line 20, change "not using" to -- not upsetting --
Line 23, change "increase the" to -- increases the --
Line 26, change "of high" to -- of breathing high --
Line 29, change "method win as" to -- method will also --
Line 60, change "air in" to -- air pressure in --

Signed and Sealed this

Twenty-sixth Day of October, 2004

JON W. DUDAS
*Director of the United States Patent and Trademark Office*